3,488,026
VEHICLE MIRROR

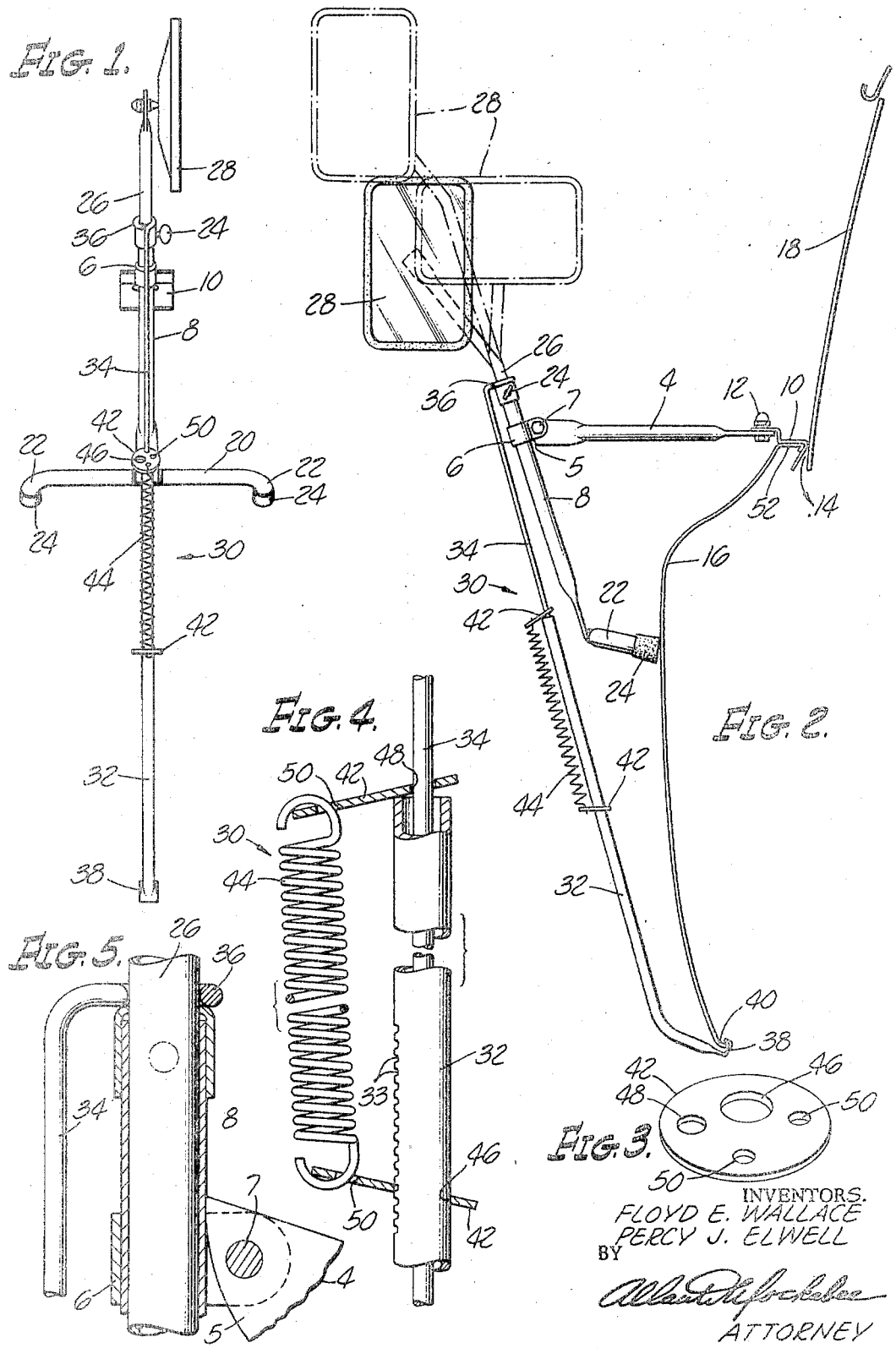

Floyd E. Wallace and Percy J. Elwell, El Segundo, Calif., assignors to Detroit Automotive Products Company doing business as Detroit Products Company, El Segundo, Calif., a corporation of California
Filed Sept. 12, 1967, Ser. No. 667,272
Int. Cl. B60r 1/06
U.S. Cl. 248—480    1 Claim

ABSTRACT OF THE DISCLOSURE

A vehicle mirror having a supporting frame for mounting on the outside of a vehicle body section with an adjustable tension member for holding the frame and mirror against movement relative to the body section wherein the tension member comprises telescoping sections, each of which passes through an aperture in one each of a pair of plates, and wherein the apertured plates cramp them at a locking angle on the telescoping sections of the tension member. The plates are individually slidable on their respective telescoping sections, one plate serving to adjustably limit inward telescoping movement, and the other plate being adjustable on its telescoping section to produce the desired spring tension.

DISCLOSURE

This invention relates to a mirror adapted to be mounted on the outside of a vehicle body section, such as a door. It is particularly adaptable for use on trucks having bodies wider than the cab or on vehicles used in towing trailers, where it is necessary to locate the mirror some distance laterally of the cab of the vehicle.

It is an object of the invention to provide a vehicle mirror having a supporting frame therefor with a tension member which is simple in construction and which is readily adjustable to fit vehicle doors of different sizes, and wherein the tension member will securely hold the frame and mirror thereon in a steady condition to securely hold the mirror frame on the vehicle door and to prevent vibratory motion of the mirror when the vehicle is moving.

Another object of the invention is to provide an adjustable tension member wherein a spring lock is utilized to provide the desired tension between a point on the mirror frame and the vehicle body or door, and wherein the spring device has anchoring means for maintaining a desired length adjustment on the tension member as well as a tensile force between a point on the vehicle and the mirror frame and a remote point such as the bottom edge of a vehicle door.

The above and other objects will more fully appear from the following description in connection with the accompanying drawing:

FIG. 1 is a side elevational view of an embodiment of the invention;

FIG. 2 is a rear elevational view of the device with the mirror in broken lines in different positions;

FIG. 3 is an enlarged plan view of one of the locking plates;

FIG. 4 is an enlarged detail, partially in section, of the tension lock;

FIG. 5 is an enlarged detail of part of the supporting frame.

The mirror frame includes a horizontal member 4 connected by a yoke 6 and nutted bolt 7 to an upwardly and outwardly slanting frame member 8. The frame member 4 has a hook-like element 10 secured thereto by a nutted bolt 12, said hook-like member being adapted to fit into a slot 14 provided in a vehicle door body 16 to accommodate a conventional vertically sliding window 18.

The frame member 8 at its lower end is connected to a horizontal member 20 having inwardly turned ends 22 provided with suitable cushions 24 which are adapted to bear against the outer side of the vehicle door 16 below the hook 10 on the horizontal frame member 4. The upper end of the upwardly slanting frame member 8 is provided with a set screw 24 which can be tightened against a mirror supporting rod 26 on the upper end of which is adapted to be suitably secured a conventional rear view mirror 28.

The tension member indicated generally at 30, includes a lower tubular member 32 with serrations 33 and an upper rod 34 telescopically slidable therein. The upper end of the rod is provided with a loop 36 which slidably receives the mirror-supporting rod 26. The lower end of the tubular element 32 is provided with a hook-like portion 38 which is adapted to fit under and around the lower edge 40 of the vehicle door 16.

In FIG. 5 the horizontal frame member 4 is shown with a curved end 5 which is shaped to lock with a camming action against the frame member 8 when the assembly is in place as in FIG. 2.

In FIG. 3 there is shown a locking plate or disc 42. One of these plates is shown in a position slidable on the upper telescoping rod 34, and the other on the lower telescoping tube 32. Between the locking plates 42 is a tension spring 44. For the sake of economy of manufacture, the two locking plates 42 are identical in construction. Each includes a large aperture 46 which is adapted to slidably receive the lower tubular telescoping section 32 of the tension member 30. The next larger aperture 48 is adapted to slidably receive the upper telescoping rod 34 and the smallest apertures 50 are provided to receive the bent ends of the tension spring 44. In other words, with one of the identical locking plates 42 at the lower end of spring 44 the tube 32 extends through an aperture 6. In the upper locking plate 42 the telescoping rod 34 extends through its aperture 48. The two small spring anchoring apertures 50 are provided so that there will be one each substantially diametrically opposite one each of the apertures 46 and 48, and the tension of the spring will apply a tilting or cramping force to the locking plate diametrically opposite the tube 32 or rod 34 as the case may be. The serrations 33 on the tension tube 32, as shown in FIG. 4, provide means for further insuring the locking of the lower plate 42 in a desired position.

When the mirror structure is mounted on a vehicle door or other suitable structure, the frame comprising members 4 and 8 is placed in the position shown in FIG. 2, whereupon the nutted bolt 7 can be tightened to resist any movement of said frame members 4 and 8 relative to each other. The mirror 28 is then set at a desired height by moving its supporting rod 26 vertically in the frame member 8 and tightening the set screw 24.

The tension member 30 is placed in position with the upper loop 36 of the rod 34 resting on the upper end of the frame member 8, and the lower hook 38 of the telescoping tube 32 hooked under the door edge 40. While placing the tension member 30 in position, the cramping plate 42 on the lower end of spring 44 is turned to a position normal to the axis of the tube 32 and the lower plate 42 is then pushed upwardly to relieve the spring 44 of any tension. This permits ready holding of the upper cramping plate 42 normal to the rod 34 so that said rod can be moved in the tube 32 to a position such as shown in FIG. 2. The upper cramping plate 42 rests upon the upper end of the tubular portion 32 of the tension member. When the tension member is in place, the lower cramping plate 42 is pushed downwardly to place the spring 44 under tension. When the lower cramping plate 42 is released, the tension of the spring will cramp it to the angular position shown, preferably engaging the serrations 33, and it will hold tightly on the tube 32, and the upper cramping plate 42 will securely hold the telescoping rod 34. If it is then found that additional tension should be applied to the tension member 30, the upper cramping plate 42 can be tilted transversely to the rod 34 and slipped upwardly somewhat and then released so that it will lock on the rod and pull the rod downwardly until the cramping plate rests upon the upper end of the tube 32.

The vehicle mirror with its tension member construction is one which is readily adaptable to vehicle doors of different thicknesses and of quite different dimensions from the sill portion 52 to the bottom edge 40. It can be quickly installed, and when in position with the spring 44 under tension, the entire mirror unit will be held securely on the vehicle and the mirror 28 will be subjected to a minimum of vibration. The tension member 30 is made of a few simple parts which will be adjustable and subject to manipulation in mounting and dismounting, but are not subject to functional mechanical failures of any kind and can be adjusted to a wide range of vehicle door thicknesses and sizes, as stated above.

It will of course be understood that various changes can be made in the form, details, arrangement and proportions of the various parts, without departing from the spirit of the invention.

We claim:
1. In a vehicle mirror for external mounting on a vehicle body section and including a frame having a mirror thereon and members having means for engaging the body section at spaced points, wherein the improvement comprises: a tension member having a first portion connected to said frame and a second portion having means for securing it to said vehicle body section, said first and second portions being interconnected for longitudinal adjustment toward and away from each other, a lock interengaging said first and second portions of said tension member and biasing said portions toward each other, and said tension member comprising a pair of telescoping sections one of which is slidably fitted in the other, said lock comprising a pair of apertured cramping plates, each accommodating one of said telescoping sections for free axially aligned sliding movement of a section of its aperture, the apertures being of such size as to cramp and lock their respective plates on the sections when the plates and the axes of their apertures and said sections are tilted out of alignment, and a tension spring having connections with said plates at points offset from the axes of said apertures.

References Cited

UNITED STATES PATENTS

| | | | |
|---|---|---|---|
| 2,552,074 | 5/1951 | Thompson | 248—279 |
| 2,560,150 | 7/1951 | Bateman | 248—410 X |
| 3,114,530 | 12/1963 | Shilling | 248—226 |
| 3,228,643 | 1/1966 | Shilling | 248—226 |
| 3,260,490 | 7/1966 | Trautner | 248—480 |

ROY D. FRAZIER, Primary Examiner

FRANK DOMOTOR, Assistant Examiner

U.S. Cl. X.R.

248—226, 410